US012440896B2

(12) United States Patent
Ansell et al.

(10) Patent No.: US 12,440,896 B2
(45) Date of Patent: Oct. 14, 2025

(54) 3-D PRINTED HYDROPHOBIC METALLIC NANOCOMPOSITES

(71) Applicant: THE UNITED STATES OF AMERICA, AS REPRESENTED BY THE SECRETARY OF THE NAVY, Arlington, VA (US)

(72) Inventors: Troy Youngmin Ansell, Marina, CA (US); Andy Nieto, Morgan Hill, CA (US); Justin Budan, Dubuwque, IA (US)

(73) Assignee: The Government of the Unites States of America, as represented by the Secretary of the Navy, Alington, VA (US)

( * ) Notice: Subject to any disclaimer, the term of this patent is extended or adjusted under 35 U.S.C. 154(b) by 219 days.

(21) Appl. No.: 18/140,271

(22) Filed: Apr. 27, 2023

(65) Prior Publication Data

US 2023/0347413 A1 Nov. 2, 2023

Related U.S. Application Data

(60) Provisional application No. 63/335,545, filed on Apr. 27, 2022.

(51) Int. Cl.
*B22F 9/04* (2006.01)
*B22F 10/28* (2021.01)
(Continued)

(52) U.S. Cl.
CPC ............... *B22F 10/28* (2021.01); *B22F 9/04* (2013.01); *B22F 10/43* (2021.01);
(Continued)

(58) Field of Classification Search
CPC ............ B22F 2302/403; B22F 2301/35; B22F 2009/043; B22F 10/28; B22F 10/43;
(Continued)

(56) References Cited

U.S. PATENT DOCUMENTS

2016/0208367 A1* 7/2016 Miller ..................... C22C 49/11

OTHER PUBLICATIONS

Bakshi, et al., "Carbon nanotube reinforced metal matrix composites—a review" in International Materials Rev., 2010 (no month), vol. 55, No. 1, pp. 41-64. (Year: 2010).*

(Continued)

*Primary Examiner* — Michael E. La Villa
(74) *Attorney, Agent, or Firm* — Heber Martin Carbajal Chavez; Scott Bell

(57) ABSTRACT

This disclosure, and the exemplary embodiments provided herein, disclose carbon nanotubes (CNT) integrated into 316L stainless steel (SS) powder feedstocks and 3D-printed using selective laser melting (SLM). Ball milling is used to disperse CNT clusters homogeneously onto the surface of 316L SS powders with minimal damage to the CNTs. Hardness increased by 35% and wear was reduced by 70% with the addition of 2 vol % CNT, relative to SLM 316L SS. The addition of CNTs increased the water contact angle and retained the desirable corrosion resistance of SLM 316L SS, demonstrating the potential of 3D-printed SS-CNT composites for use in structural marine applications.

11 Claims, 10 Drawing Sheets

(51) Int. Cl.
| | | |
|---|---|---|
| *B22F 10/43* | (2021.01) | |
| *B23K 15/00* | (2006.01) | |
| *B23K 15/06* | (2006.01) | |
| *B23K 26/00* | (2014.01) | |
| *B23K 26/14* | (2014.01) | |
| *B23K 26/144* | (2014.01) | |
| *B23K 26/342* | (2014.01) | |
| *B32B 5/16* | (2006.01) | |
| *B32B 15/01* | (2006.01) | |
| *B32B 15/04* | (2006.01) | |
| *B32B 15/18* | (2006.01) | |
| *B33Y 10/00* | (2015.01) | |
| *B33Y 40/10* | (2020.01) | |
| *B33Y 70/00* | (2020.01) | |
| *B33Y 70/10* | (2020.01) | |
| *B33Y 80/00* | (2015.01) | |
| *C22C 1/05* | (2023.01) | |
| *C22C 1/10* | (2023.01) | |
| *C22C 26/00* | (2006.01) | |
| *C22C 47/00* | (2006.01) | |
| *C22C 47/14* | (2006.01) | |
| *C22C 49/02* | (2006.01) | |
| *C22C 49/08* | (2006.01) | |
| *C22C 49/14* | (2006.01) | |
| *B22F 10/25* | (2021.01) | |
| *B23K 103/00* | (2006.01) | |
| *B23K 103/04* | (2006.01) | |

(52) U.S. Cl.
CPC ...... *B23K 15/0086* (2013.01); *B23K 15/0093* (2013.01); *B23K 15/06* (2013.01); *B23K 26/0006* (2013.01); *B23K 26/144* (2015.10); *B23K 26/147* (2013.01); *B23K 26/342* (2015.10); *B32B 5/16* (2013.01); *B32B 15/01* (2013.01); *B32B 15/011* (2013.01); *B32B 15/04* (2013.01); *B32B 15/043* (2013.01); *B32B 15/18* (2013.01); *B33Y 10/00* (2014.12); *B33Y 40/10* (2020.01); *B33Y 70/00* (2014.12); *B33Y 70/10* (2020.01); *B33Y 80/00* (2014.12); *C22C 1/05* (2013.01); *C22C 1/10* (2013.01); *C22C 1/1005* (2013.01); *C22C 1/1084* (2013.01); *C22C 26/00* (2013.01); *C22C 47/00* (2013.01); *C22C 47/14* (2013.01); *C22C 49/02* (2013.01); *C22C 49/08* (2013.01); *C22C 49/14* (2013.01); *B22F 2009/043* (2013.01); *B22F 10/25* (2021.01); *B22F 2301/35* (2013.01); *B22F 2302/403* (2013.01); *B23K 2103/05* (2018.08); *B23K 2103/52* (2018.08); *C22C 2026/002* (2013.01); *Y10T 428/12576* (2015.01); *Y10T 428/12979* (2015.01); *Y10T 428/12993* (2015.01)

(58) Field of Classification Search
CPC ........ B22F 10/25; B22F 9/04; B23K 15/0086; B23K 15/0093; B23K 15/06; B23K 26/0006; B23K 26/144; B23K 26/147; B23K 26/342; B23K 2103/05; B23K 2103/52; B33Y 10/00; B33Y 40/10; B33Y 70/00; B33Y 70/10; B33Y 80/00; C22C 1/05; C22C 1/1084; C22C 1/10; C22C 1/1005; C22C 2026/002; C22C 47/14; C22C 47/00; C22C 49/02; C22C 49/08; C22C 49/14; C22C 26/00; B32B 5/16; B32B 15/01; B32B 15/011; B32B 15/04; B32B 15/043; B32B 15/18; Y10T 428/12979; Y10T 428/12993; Y10T 428/12576

See application file for complete search history.

(56) References Cited

OTHER PUBLICATIONS

Chang et al., "Direct metal laser sintering synthesis of carbon nanotube reinforced Ti matrix composites . . . " in J. Mater. Res., vol. 31, No. 2, Jan. 28, 2016, pp. 281-291. (Year: 2016).*

* cited by examiner

3-D PRINTED HYDROPHOBIC METALLIC NANOCOMPOSITES

CROSS REFERENCE TO RELATED PATENT(S) AND APPLICATION(S)

This application claims the benefit of U.S. Provisional Application No. 545 filed Apr. 27, 2022, and entitled 3D PRINTING HYDROPHOBIC METALLIC NANOCOMPOSITES, which is hereby incorporated in its entirety by reference.

BACKGROUND

The present exemplary embodiment relates to 3D PRINTED HYDROPHOBIC METALLIC NANOCOMPOSITES AND METHODS. It finds particular application in conjunction with methods to generate carbon hydrophobic metal nanocomposites and printing using said composites using a support structure and will be described with particular reference thereto. However, it is to be appreciated that the present exemplary embodiment is also amenable to other like applications.

Corrosion is an expensive issue that effects all sectors of the United States. A recent study by the Government Accountability Office estimated the cost due to corrosion to the Department of Defense (DOD) alone was close to $21 billion per year. This number is only the direct cost of corrosion to the DOD. Not included are the indirect costs like operational downtimes, etc. The need for corrosion resistant materials is ever present for the DOD, especially the U.S. Navy. With increasing corrosion related costs of an aging fleet and associated system sustainment and maintenance, that need is increasing. With the advent of additive manufacturing (3D printing), new strategies for protecting metallic surfaces may be possible. One possibility is the fabrication of components with a surface engineered to be hydrophobic. Some strategies to achieve this includes, engineering a surface with periodic "roughness" that prevents water droplet interaction with the substrate and/or application of a composite surface that inherently resists corrosion.

Hydrophobic is a water droplet's difficulty wetting a surface. Hydrophobic surfaces are those surfaces where the droplet contact angle made with the surface is greater than 90°. When this contact angle is greater than 150°, the surface is termed superhydrophobic. Examples of hydrophobicity can be found in nature with certain plants exhibiting what is called the "Lotus Effect." The effect is named after the Lotus flower, specifically the *Nelumbo nucifera*, a genus of aquatic plants whose flowers prevent water from wetting the surface of the flower. The Lotus, and other plants (e.g., the tulip poplar leaf) that exhibit the Lotus Effect, use this property for self-cleaning. In the case of the Lotus, microscopic features on the surface of the leaf prevents water from effectively wetting the surface. Efforts to mimic this behavior in materials has seen success as exemplified by the spray-on surface NeverWet™ family of products. Work has also been conducted on the development of permanent polymer-based coatings. These protective coatings; however, suffer the disadvantage of poor durability. Either from UV exposure or mechanical wear, these coatings once removed take the superhydrophobicity with them. Additionally, these materials are not organically hydrophobic. They require chemical treatment to turn into a hydrophobic material. Often this treatment requires toxic chemicals like fluorosilane to activate hydrophobicity. Is it instead possible to fabricate a metallic surface that is hydrophobic as-fabricated without the need for chemical treatment?

Additive manufacturing (AM) of metallic materials has been generating much interest and excitement in the manufacturing and materials science community due to its ability to rapidly fabricate parts layer-by-layer. From an engineering perspective, metal AM enables manufacturing at the point of need, thereby cutting down logistical hurdles and costs, and can enable expeditionary manufacturing in remote sites for both humanitarian and military endeavors.[Refs. 1 and 2] From a materials perspective, metal AM provides a unique tool where materials can be tailored layer-by-layer into bulk structures. Selective laser melting (SLM) is a powder-based method that deposits a layer of powder that is then melted and rapidly solidified into the desired geometry. [Ref. 3] By varying laser parameters and powder feedstocks, one can control composition, residual stresses, layer thickness, and the thermal history of each layer.[Refs. 4-8] This results in microstructures and properties that can be tailored within a single build layer and throughout the build direction. Thus far, relatively few efforts have been made to utilize metal AM techniques such as SLM to process metal matrix composites (MMCs).[Refs. 6, and 9-12].

INCORPORATION BY REFERENCE

The following publications are incorporated by reference in their entirety.

[Ref. 1] J. den Boer, W. Lambrechts, H. Krikke, J. Clean. Prod. 257, 120301 (2020).
[Ref. 2] D. Thomas, Int. J. Adv. Manuf. Technol. 85, 1857-1867 (2016).
[Ref. 3] J. Gunasekaran, P. Sevvel, I. J. Solomon, Mater. Today 37, 252-256 (2021).
[Ref. 4] U.S. Bertoli, G. Guss, S. Wu, M. J. Matthews, J. M. Schoenung, Mater. Des. 135, 385-396 (2017).
[Ref. 5] X. Zhang, C. J. Yocom, B. Mao, Y. Liao, J. Laser Appl. 31, 031201 (2019).
[Ref. 6] D. Gu, H. Chen, D. Dai, C. Ma, H. Zhang, K. Lin, L. Xi, T. Zhao, C. Hong, A. Gasser, R. Poprawe, iScience 23, 101498 (2020).
[Ref. 7] A. L. Vyatskikh, T. B. Slagle, S. Jiang, S. A. El-Azab, U.S. Bertoli, L. Valdevit, E. J. Lavernia, J. M. Schoenung, J. Mater. Eng. Perform. 30, 6606-6617 (2021).
[Ref. 8] X. Wang, B. Zheng, K. Yu, S. Jiang, Y. Zhou, E. J. Lavernia, J. Schoenung, Microsc. Microanal. 27, 2678-2680 (2021).
[Ref. 9] K. Chang, D. Gu, J. Mater. Res. 31, 281-291 (2016).
[Ref. 10] A. Reinhart, T. Y. Ansell, W. Smith, A. Nieto, J. Mater. Eng. Perform. 30, 6949-6960 (2021).
[Ref. 11] A. DeMartino, T. Y. Ansell, A. Nieto, Adv. Eng. Mater. 24, 2100737 (2022).
[Ref. 12] H. Yin, J. Yang, Y. Zhang, L. Crilly, R. L. Jackson, X. Lou, Wear 496-497, 204281 (2022).
[Ref. 13] S. R. Bakshi, D. Lahiri, A. Agarwal, Int. Mater. Rev. 55, 41-64 (2010).
[Ref. 14] C. Qin, X. Shi, S. Q. Bai, L. D. Chen, L. J. Wang, Mater. Sci. Eng. A 420, 208-211 (2006).
[Ref. 15] A. Nieto, A. Agarwal, D. Lahiri, A. Bisht, S. R. Bakshi, *Carbon Nanotubes—Reinforced Metal Matrix Composites*, 2nd edn. (CRC Press, Boca Raton, 2021)
[Ref. 16] V. B. Vukkum, J. Christudasjustus, A. A. Darwish, S. M. Storck, R. K. Gupta, NPJ Mater. Degrad. 6, 1-11 (2022).

[Ref. 17] D. Kaewsai, A. Watcharapasorn, P. Singjai, S. Wirojanupatump, P. Niranat-lumpong, S. Jiansirisomboon, Surf. Coat. Technol. 205, 2104-2112 (2010).

[Ref. 18] T. Y. Ansell, T. Hanneman, A. Gonzalez-Perez, C. Park, A. Nieto, Part. Sci. Technol. 39, 981-989 (2021).

[Ref. 19] M. Yakout, M. A. Elbestawi, S. C. Veldhuis, J. Mater. Process. Technol. 266, 397-420 (2019).

[Ref. 20] T. Kuzumaki, K. Miyazawa, H. Ichinose, K. Ito, J. Mater. Res. 13, 2445-2449 (1998).

[Ref. 21] C. M. Bailey, J. A. Morrow, E. M. Stallbaumer-Cyr, C. Weeks, M. M. Derby, S. M. Thompson, J. Manuf. Sci. Eng. 144, 081010 (2022).

[Ref. 22] C. Li, J. Zhang, J. Han, B. Yao, Sci. Rep. 11, 459 (2021).

[Ref. 23] K. T. Hong, H. Imadojemu, R. L. Webb, Exp. Thermal Fluid Sci. 8, 279-285 (1994).

[Ref. 24] A. K. Fard, G. Mckay, Y. Manawi, Z. Malaibari, M. A. Hussien, Chemosphere 164, 142-155 (2016).

[Ref. 25] P. Joseph, C. Cottin-Bizonne, J.-M. Benoit, C. Ybert, C. Journet, P. Tabeling, L. Bocquet, Phys. Rev. Lett. 97, 156104 (2006).

[Ref. 26] A. Nieto, J. M. Zhao, Y.-H. Han, K. H. Hwang, J. M. Schoenung, J. Mech. Behay. Biomed. Mater. 61, 122-134 (2016).

[Ref. 27] J. Quan, K. Lin, D. Gu, Powder Technol. 364, 478-483 (2020).

[Ref. 28] G. Sander, D. Jiang, Y. Wu, N. Birbilis, Mater. Des. 196, 109179 (2020).

[Ref. 29] Z. Zhang, X. Yuan, Z. Zhao, X. Li, B. Liu, P. Bai, J. Electroanal. Chem. 894, 115351 (2021).

[Ref. 30] J. Nie, L. Wei, Y. Jiang, Q. Li, H. Luo, Mater. Today Commun. 26, 101648 (2021).

[Ref. 31] US Published Patent Application 2023/0021998, by Andy Nieto, et al., published Jan. 26, 2023, and entitled 3D Printed Carbon Nanotube Reinforced Titanium Composites and Methods.

[Ref. 32] US Published Patent Application 2023/0027624, by Andy Nieto, et al., published Jan. 26, 2023, and entitled 3D Printed Oxide Reinforced Titanium Composites and Methods.

[Ref. 33] Budan, Justin M., ENGINEERING SUPERHYDROPHOBIC BEHAVIOR IN 3D-PRINTED STAINLESS STEEL COMPOSITES, Thesis, Naval Postgraduate School, June 2022.

BRIEF DESCRIPTION

In accordance with one embodiment of the present disclosure, disclosed is a method of 3D-printing a hydrophobic metallic body comprising: generating a composite powder by mixing metal powder with a nanotube material in a high energy ball mill, wherein the high energy ball mill is used to perform multiple milling cycles, wherein each cycle is approximately five minutes of milling followed by approximately five minutes of inactivity for cool-down; configuring a support structure, wherein the support structure includes large cylindrical support structures along an edge of a target print area of a build plate associated with a 3D printing process used to 3D print the hydrophobic metallic body; and printing, using a selective laser melting machine, the hydrophobic metallic body and the support structure with the compositive powder.

In accordance with another embodiment of the present disclosure, disclosed is a 3D printed hydrophobic metallic body comprising: a 3D printed composite powder, the composite powder generated by mixing metal powder with a nanotube material in a high energy ball mill, wherein the high energy ball mill is used to perform multiple milling cycles, and each cycle is approximately five minutes of milling followed by approximately five minutes of inactivity for cool-down, wherein a support structure is used during a 3D printing process to 3D print the hydrophobic metallic body, the support structure including large cylindrical support structures along an edge of a target print area of a build plate associated with the 3D printing process, and wherein a selective laser melting machine is used to 3D print the hydrophobic metallic body.

In accordance with another embodiment of the present disclosure, disclosed is a 3D-printed stainless steel composite comprising: carbon nanotubes (CNTs); and stainless steel material, wherein the CNTs are 1% and 2% by volume.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
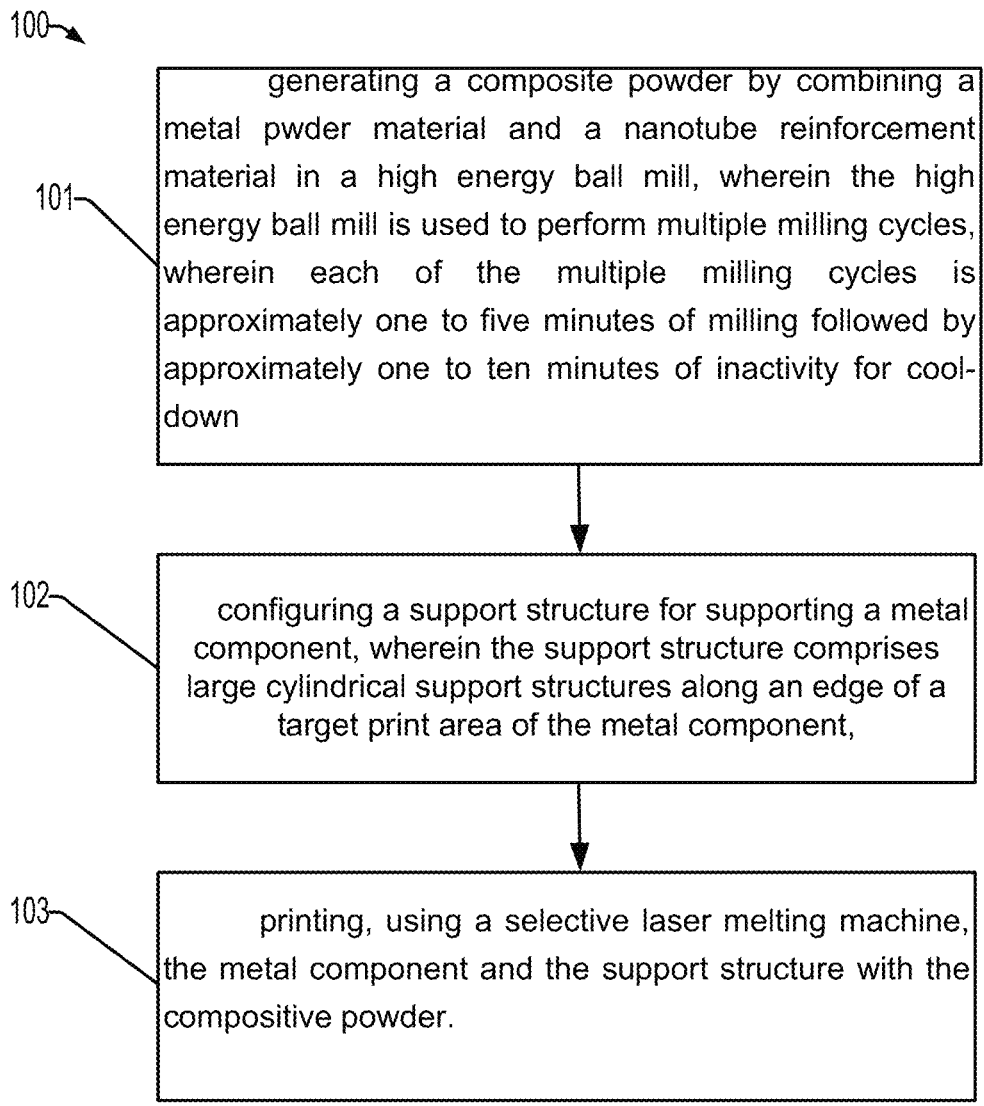
FIG. 1 is a flow chart of a method of 3D printing hydrophobic metal nanocomposites according to an exemplary embodiment of this disclosure.

It is now possible to print metallic and metallic composite parts exhibiting complex geometries too difficult to fabrication with conventional methods, e.g., sand or investment casting. This includes the printing of tiny features with a high degree of fidelity with the corresponding digital model. To make the metal a composite, carbon nanotubes (CNTs) are mixed with the metal precursor powders. The composite powder is then printed. The description below provides examples of the printing of hydrophobic metal composite parts with tiny structures reinforced with CNTs.

3D printing can incorporate nanoparticles that exhibit hydrophobic properties and transfer this effect to the substrate, 3D printing enables printing of very fine micropillars, and together, 3D printing a nanocomposite enables realization of the Cassie-Baxter state at multiple length-scales. As will be described below in further detail, printing metallic composites superhydrophobic as a complete body and printing metallic composites superhydrophobic surfaces directly on a metal substrate provides for enhanced long-term corrosion protection.

This disclosure presents a new concept for achieving hydrophobic metallic surfaces and the methodology to do so using 3D printing or additive manufacturing techniques. A hydrophobic effect can be achieved by inducing a Cassie-Baxter state, where a droplet of water rests on asperities on a surface that create an air barrier to the water droplet being in complete contact with the surface underneath the asperity tips. This disclosure induces a Cassie-Baxter state onto a metallic surface at multiple scales. At a meso to micro scale, 3D printing is utilized to engineer fine arrays of micrometric high-aspect ratio pillars. These pillars are made of a metallic nanocomposite reinforced with high aspect ratio nanoparticles, such as carbon nanotubes. The presence of nanotubes on the metallic surface provides a Cassie-Baxter state at the nanoscale. This engineering multi-scale Cassie-Baxter state on the 3D printed metallic nanocomposites endows them with enhanced hydrophobicity that is unattainable individually by 3D printing micropillars or with a bulk nanocomposite without micropillars. This engineering hydrophobicity does not require the use of harsh or toxic chemical (e.g., polymeric) coatings or layers, and provides a solution for self-cleaning and corrosion resistant metallic surfaces.

Carbon nanotubes (CNTs) have been studied over the last two decades as potential reinforcements for metal matrix composites due to their outstanding mechanical properties such as high elastic modulus (~1 TPa [Ref. 13]) and tensile strength (~100 GPa [Ref. 13]), alongside excellent functional properties such as high thermal and electrical conductivity.[Ref. 14] CNT-MMCs are very promising, as CNTs have successfully endowed the MMC with superior hardness, strength, ductility, toughness, as well as thermal and electrical conductivity. [Ref. 15] The greatest challenge in CNT-MMCs continues to be the uniform dispersion of CNTs in the metallic matrix. SLM is an attractive processing technique for CNT-MMCs as it starts with powders, allowing for precise control of composite and feedstock characteristics, and consolidates the material by melting and rapid solidification. The formation of the melt pool, albeit brief, can promote the dispersion of CNTs within the melt pool. [Refs. 9 and 11] Furthermore, rapid solidification minimizes the time available for reactions between CNTs and the metal matrix. The high thermal conductivity of CNTs may also enable the control or mitigation of thermal gradients that induce large thermal stresses.

316L stainless steel (SS) is a structural material with good corrosion resistance and the use of ceramic reinforcements such as TiC, TiN, and CrN have been incorporated to improve mechanical properties and corrosion resistance. [Ref. 16] The use of CNTs to reinforced SS has been used in a few studies, [Ref. 15], only one of which utilized additive manufacturing. [Ref. 13] Thermally sprayed SS-CNT coatings have exhibited enhanced hardness and wear resistance. [Ref. 17] CNTs infused into the crack-tip of 304 SS specimens enhanced the fatigue life due to the resulting finer grain size and the bundling of CNTs acting as crack-arrestors. [Ref. 16]

In this disclosure, 316 L SS composites are reinforced with 1-2 vol % of CNTs and 3D-printed using SLM. This disclosure, and the exemplary embodiments described herein, disperse CNTs uniformly with minimal damage while retaining the spherical morphology of metal particulates requisite for SLM processing. 3D-printed SS-CNT composites are evaluated for their mechanical and wear properties, corrosion characteristics, and surface wettability with water to gauge their suitability for structural marine applications. Few studies on SS-CNT materials produced by any technique have evaluated wetting contact angle and corrosion characteristics, and no such studies have been conducted on SLM-produced SS-CNT composites.

With reference to FIG. 1, shown is a flow chart of a method of 3D printing carbon nanotube reinforced titanium composites according to an exemplary embodiment of this disclosure.

Initially, at step 101, the method generates a composite powder by combining a metal powder material and a nanotube reinforcement material in a high energy ball mill, wherein the high energy ball mill is used to perform multiple milling cycles, wherein each of the multiple milling cycles is approximately one to five minutes of milling followed by approximately one to ten minutes of inactivity for cool-down.

It is to be understood that this disclosure, and the exemplary embodiments described, are not limited to multiple milling cycles of approximately one to five minutes of milling followed by approximately one to ten minutes of inactivity for cool-down. Other processing parameters include multiple milling cycles, wherein each milling cycle is at least one minute of milling followed by at least one minute of inactivity for cooldown. According to one exemplary embodiment, the process includes multiple milling cycles, wherein each milling cycle is approximately two minutes of milling followed by approximately five minute of inactivity for cool-down.

Next, at step 102, the method configures a support structure for supporting a metal component, wherein the support structure comprises large cylindrical support structures along an edge of a target print area of the metal component.

Next, at step 103, the method 3D prints, using a selective laser melting machine, the metal component, and the support structure with the compositive powder.

Now provided below, are further details of the disclosed 3D Printed Carbon Nanotube Reinforced Stainless Steel Composites and Methods.

Additive Manufacturing of Metals

Additive manufacturing (AM) is a process for fabricating three-dimensional objects via the production and buildup of fine layers of a given material. The primary driver for this innovation is the ability to seamlessly move from digital, computer-aided design (CAD) to a final, complex product saving both time and money over traditional subtractive fabrication methods, such as machining, that lead to significant material wastage. There are two primary means of metal AM, Direct Energy Deposition (DED) and Powder Bed Fusion (PBF). DED is an in-situ process of directly melting a stream of metal wire or powder using a higher energy source, such as laser, and laying down the melt layer-by-layer. Analogous to the age-old method of cladding, DED allows for large-scale production in a 5-axis format similar to its top-down counterpart of milling [Re.1]. PBF entails a means of laying down a layer of metal powder, which is subsequently fused through various methods, before the next powder layer is added on top. While there are lower energy methods, which involve sintering of these powders for fusion, these methods often leave material porous. However, there are various methods, which involve direct melting of the powders to result in a fusion welded, finished product.

Figure 2A:
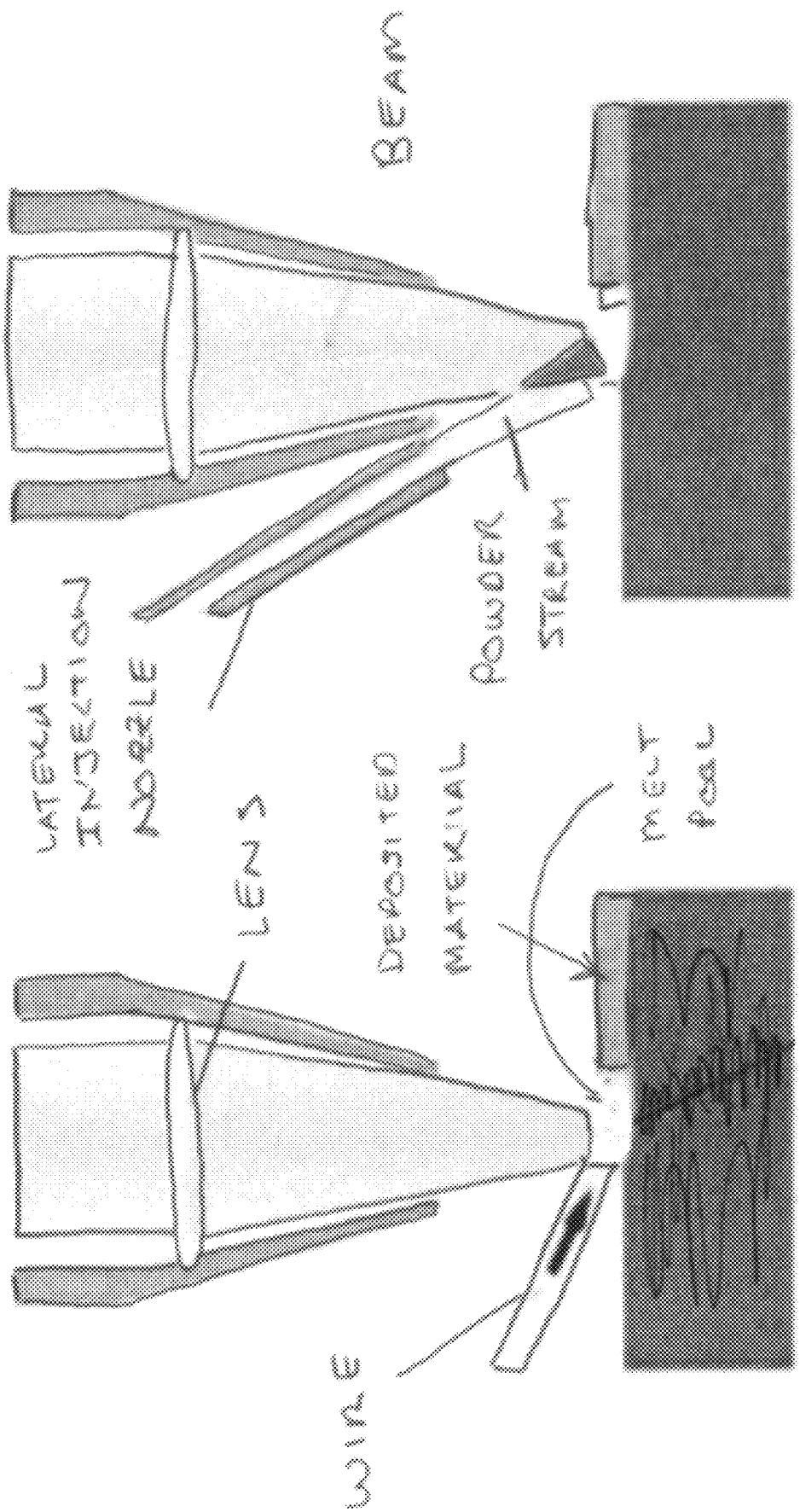
FIGS. 2A-2C show common commercial metal 3D printing methods: DED (FIG. 2A), EBM (FIG. 2B), and SLM (FIG. 2C). Sources: [Ref. 3].
Figure 2B:
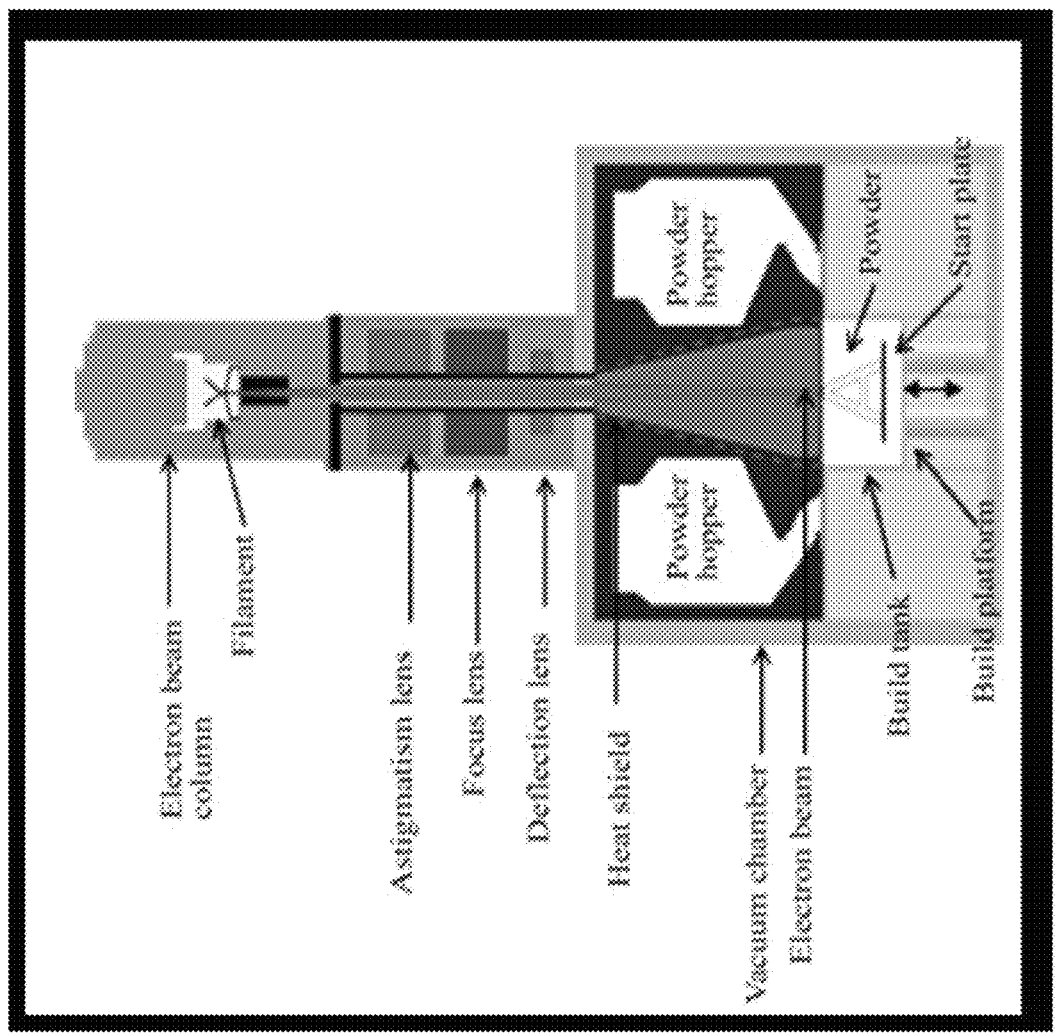
Figure 2C:
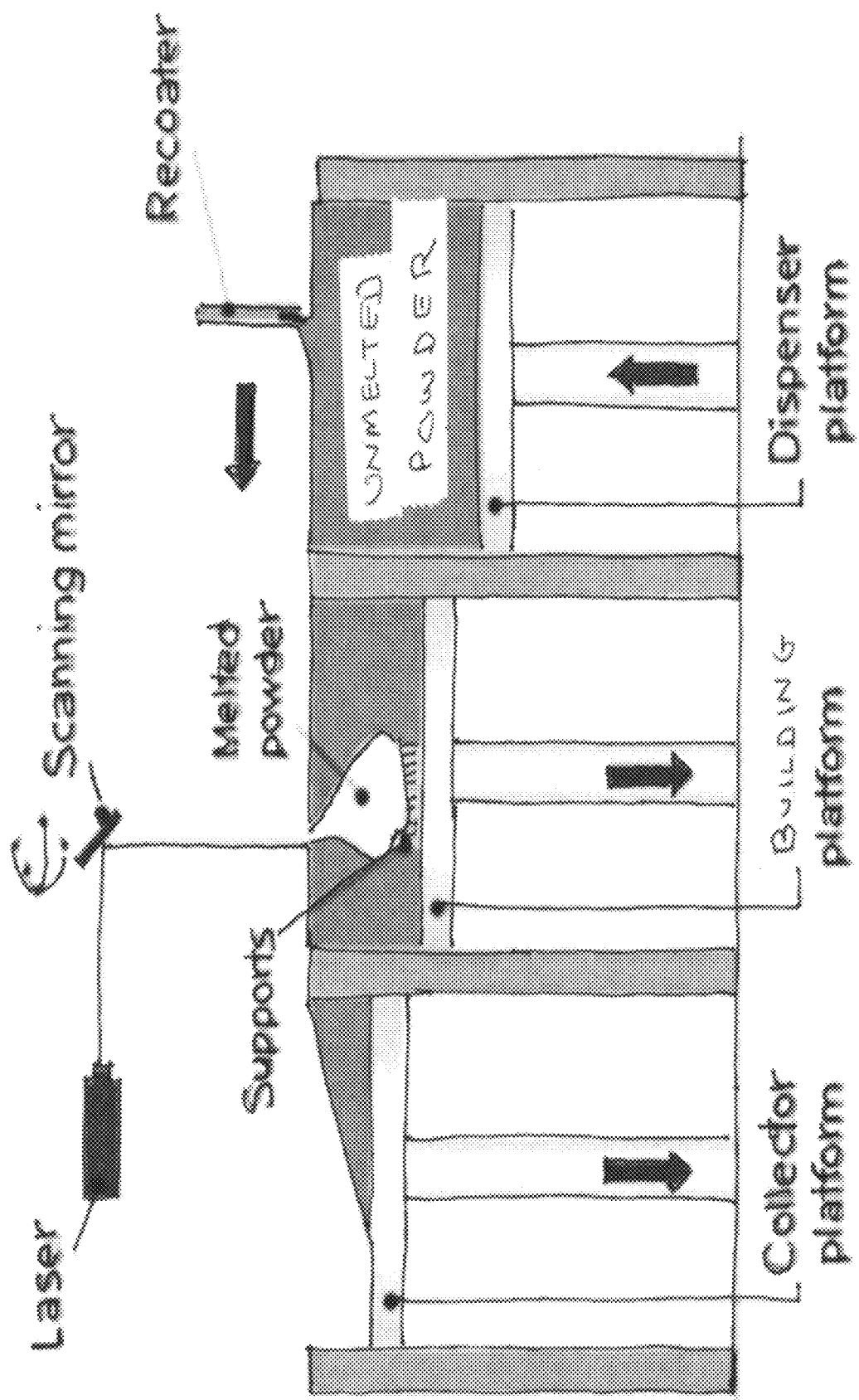

Electron beam melting (EBM) and select laser melting (SLM) are the most common methods of direct melt PBF, and while they are similar in concept and construction, they utilize a different process to heat the powder to melting. EBM operates in a large vacuum, extracting and accelerating electrons using a large potential (i.e., 60 kV), which then bombard the powder bed surface in an x-y pattern. Commonly this is accomplished by a rapid initial pass, which preheats the powder to approximately 80% melting temperature of the material, followed by a subsequent slower pass generating the desired melt pool based on the input from the CAD software. SLM on the other hand uses a focused, fiber laser (typically Yb), which is directed to a CAD controlled mirror, which controls the raster pattern (in x-y, x, or y direction) incident onto the powder bed. Unlike EBM, which operates in a vacuum, the SLM has a constant purge of Argon gas, which assists in component cooling and prevents oxidation [Ref. 2]. An example of these three processes is illustrated in FIGS. 2A, 2B and 2C.

Materials and Methods Materials and Composite Powder Processing

Figures 3A, 3B, 3C, 3D, 3E, 3F:
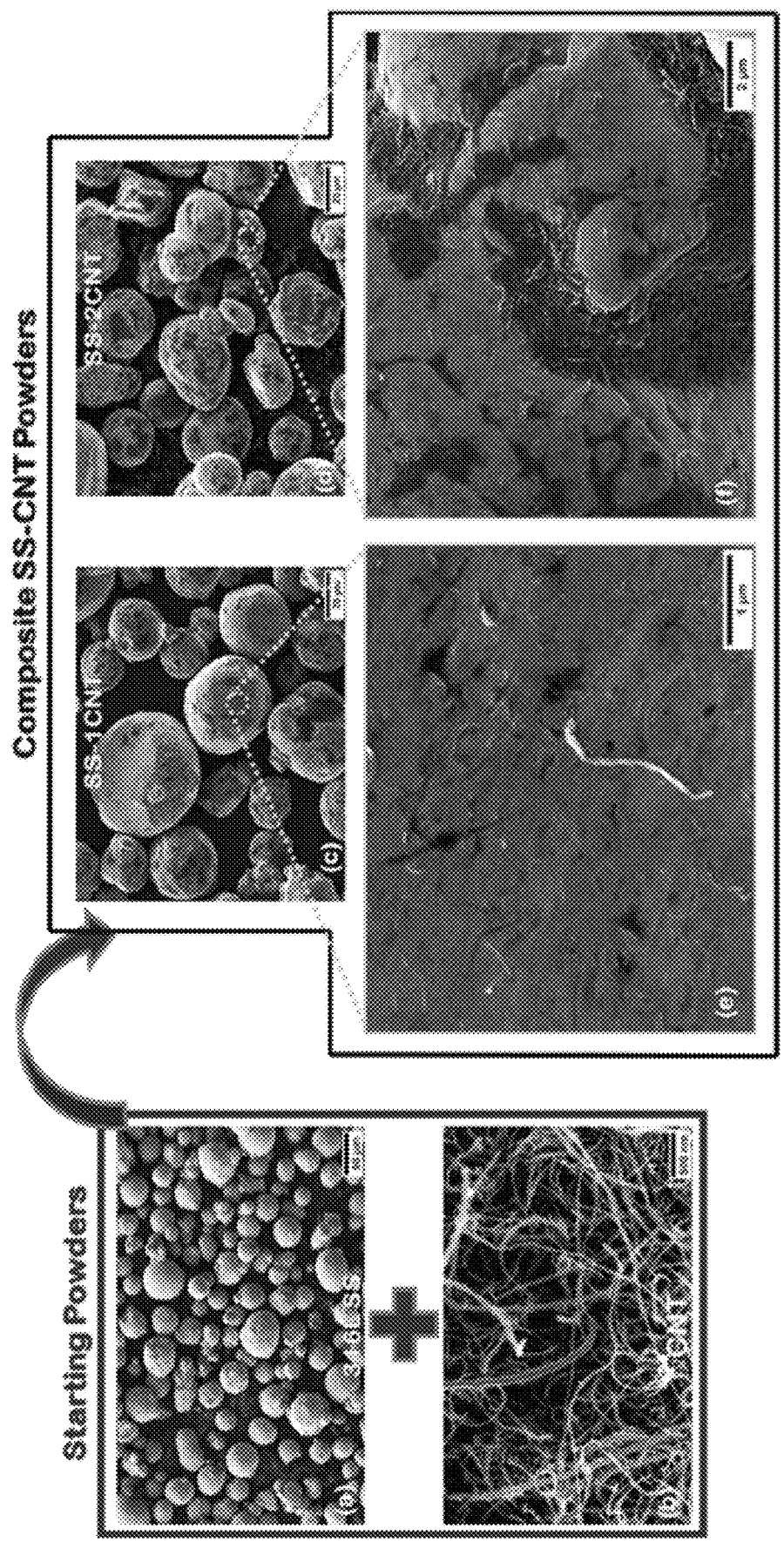
FIGS. 3A-3F show (a) starting 316L stainless steel powder, (b) starting multi-walled carbon nanotubes, (c) SS-1CNT powder, (d) SS-2CNT powder, (e) high magnification image of region with low CNT concentration in SS-1CNT, showing 1-2 µm long CNTs attached and partially embedded in the surface of steel particulates, (f) high magnification image of regions with high CNT concentration (darker phase in low mag images) showing CNT clusters on the surface of steel particulates.
Figure 4:
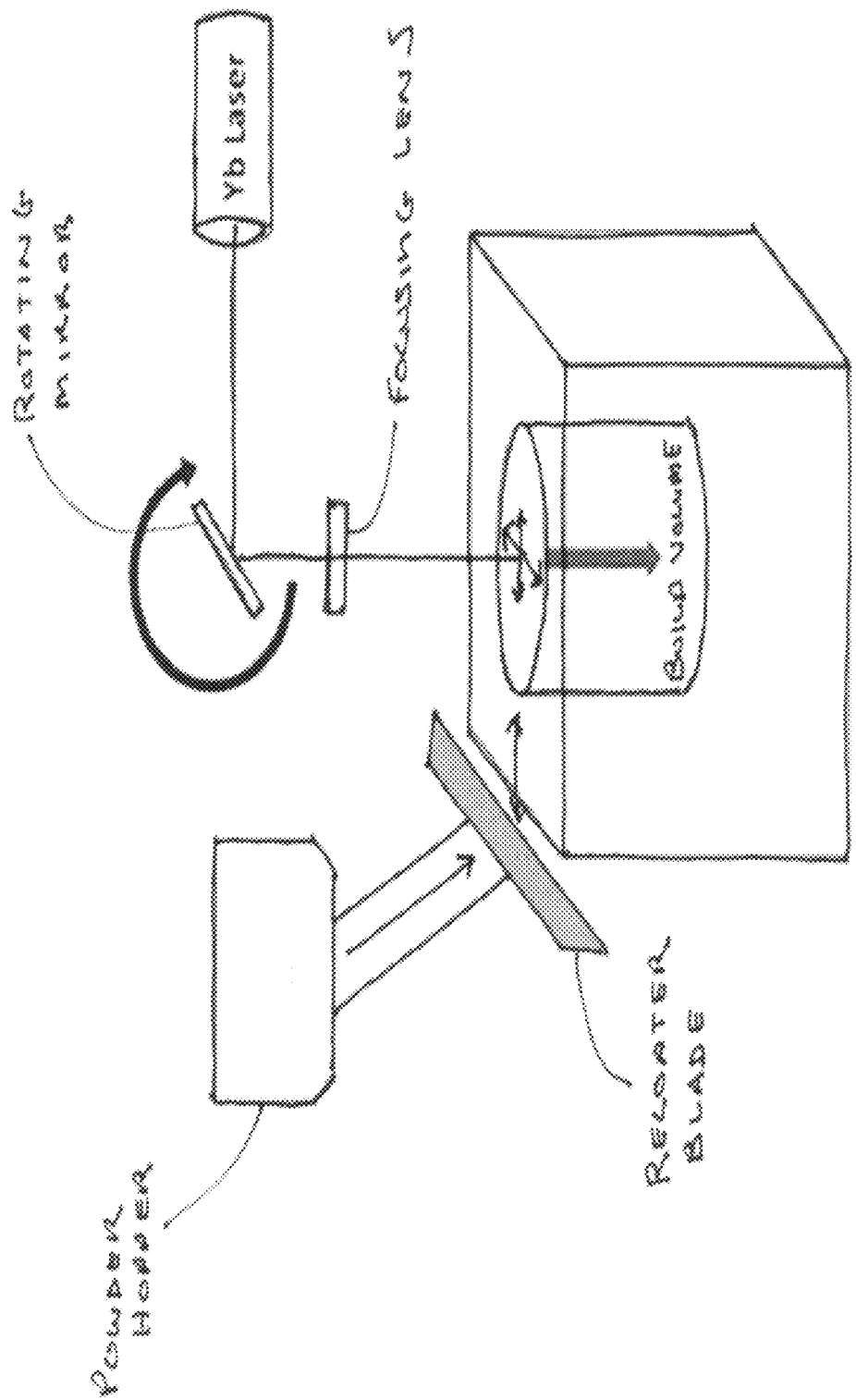
FIG. 4 is an Illustration of EOS M100 operations.
Figure 5A:
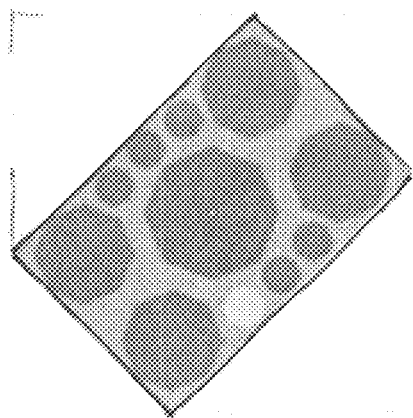
FIGS. 5A-5D show supports generated in MATERIALISE MAGICS Software: cylinder support (FIGS. 5A/B) and full volume supports (FIGS. 5C/D).
Figure 5B:
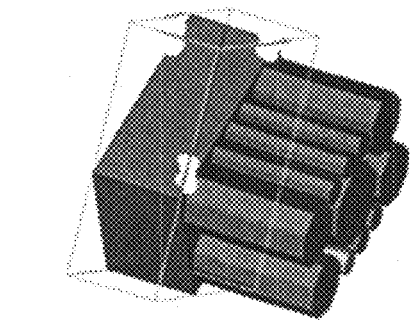
Figure 5C:
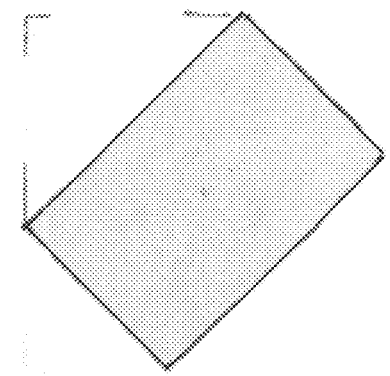
Figure 5D:
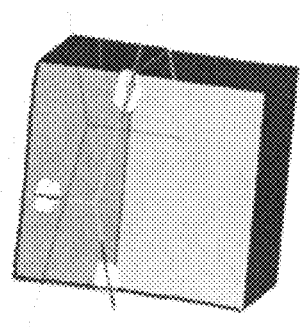

A conventionally fabricated plate of 316L stainless steel (316L SS, ⅜ inch thick, 8×8 inch, yield strength ~207 MPa, 4816T53) was procured for comparison with the 3D-printed materials. The conventional 316L SS material was fabricated by hot rolling, then milled (machined) into a plate and subsequently into 20 mm diameter disks and is referred to as "Milled SS" henceforth. The starting 316L stainless steel powder used for the control specimens and for making SS-CNT composites was procured from EOS of North America (Novi, MI) and designed specifically for use on their M100 metal 3D printer. The powder had a composition in accordance with ASTM F138 for 18Cr-14Ni-2.5 Mo stainless steels and a max particle size of 63 μm. The starting powder is presented in FIG. 3A. The powder is primarily spherical, with a few irregular-shaped particles present. As reinforcement, multi-walled CNTs (MWCNTs, >95 wt % purity) were procured from Cheap Tubes Inc (#030103, Grafton, VT), which were 10-20 nm in diameter and 10-30 μm long [FIG. 3B)].

The SS-CNT powders were synthesized using a high-energy ball mill (SPEX Sample Prep 8000M Mixer/Mill machine), operating using "low energy" milling conditions developed in our prior work.[Ref. 18] Milling was conducted using 3 mm diameter 304L stainless steel balls. A low ball-to-powder ratio (BPR) of 1:2 was utilized to ensure CNT clusters are broken up and dispersed without adversely affecting the spherical morphology of 316L SS powders needed for adequate flowability during 3D printing via SLM. A cycle of milling consisted of 5 min of active milling, followed by a 5 min cool-off period to ensure excessive heat is not generated. Excessive heat could lead to steel particles sintering or cold welding together, CNT oxidation, and/or reactions between SS and CNTs. Composite powders with 1 vol % CNT reinforcement (SS-1 CNT), and 2 vol % CNT reinforcement (SS-2CNT) were synthesized using 5 and 10 milling cycles, respectively.

Selective Laser Melting Processing

The composite powders were printed into bulk parts using an EOS M100 metal 3D printer. The M100 operates in an argon environment and utilizes a 200 W Yb fiber laser. The composite powders are placed in an oven at ~90° C. for ~24 h prior to 3D printing to remove moisture. The powders exhibited good flowability as they consistently spread into planar and uniform layers across the print bed during the SLM printing process. Printing was conducted using a laser energy density of 66.5 J/mm$^3$, which was attained using a laser power of 77.1 W, laser scan speed of 827 mm/s, hatch spacing of 0.07 mm, and a powder layer thickness of 0.02 mm. These are the default parameters developed by the manufacturer for 3D printing 316 L SS. Cylindrical specimens with a diameter of 20 mm and thickness of 4 mm were printed for corrosion, wear, and hardness testing. In order to obtain a smoother surface finish for water contact angle (WCA) measurements, samples were printed with a higher laser energy density of 80 J/mm$^3$. This energy density was attained by using a laser power of 76.8 W, laser scan speed of 800 mm/s, hatch spacing of 0.06 mm, and a powder layer thickness of 0.02 mm. Square specimens with a length of 20 mm and thickness of 2 mm were printed for WCA measurements.

Characterization

The density of 3D-printed specimens was measured using the Archimedes method. Relative densities were calculated based on vendor-provided values of CNTs (2.1 g/cm$^3$) and published values for 316L SS (8.0 g/cm3 [Ref. 19]). A ZEISS NEON 40 scanning electron microscope (SEM) was used to characterize the starting 316L and CNT powders using an accelerating voltage of 2 kV and a working distance of 10 mm using an EVERHART THORNLEY secondary electron detector. An FEI Inspect F50 SEM was used to image the composite powders using an accelerating voltage of 2 kV and a working distance of 12 mm.

Mechanical Property Evaluation

Vickers hardness testing was conducted using MITUTOYO VICKERS hardness machine. The 1200-grit SiC metallographically prepared specimens were subjected to a 200 g load for 15 s dwell time, and a total of 10 hardness measurements were taken for each specimen. Wear testing was conducted using a dry sliding ball-on-disk tribometer (T50, Nanovea, Irvine, CA) in order to evaluate wear resistance and coefficient of friction (CoF). Wear tests were conducted on SS-1CNT, SS-2CNT, the control 3D-printed 316L SS, and a milled 316L plate (not 3D printed). Wear tests were conducted using a normal load of 15 N and a rotational speed of 100 RPM for 30 min on a 3 mm diameter track, corresponding to a total linear sliding distance of 28.2 m. A 3 mm diameter aluminum oxide ball is used as the counter-surface. An LVDT sensor acquired data every 50 ms to measure the lateral force used to calculate the CoF. Weight measurements are taken using a precision balance before and after the wear test to evaluate wear resistance.

Contact Angle and Corrosion Testing

Water contact angle measurements were conducted using distilled water and a KRÜSS Mobile Surface Analyzer (MSA, Hamburg, Germany.) Approximately 2.0 μL of distilled water was dispensed from micropipettes onto the sample surface. The MSA was then placed over the droplets to measure the contact angles with water.

Electrochemical Testing

Cyclic potentiodynamic polarization (CPP) tests were con-ducted on Milled SS, SLM SS, SS-1CNT, and SS-2CNT in 3.5 wt % NaCl electrolyte at room temperature on the specimens metallographically prepared to 1200-grit SiC grinding. For corrosion testing, a three-electrode flat cell with a saturated calomel reference electrode (SCE) and a platinum mesh counter electrode was used. The forward scans were initiated at 200 mV$_{SCE}$ below the open circuit potential (OCP) following a 1 mV/s scan rate. The forward scans were ceased, and reverse scans were commenced when either 1.5 $V_{SCE}$ potential or 100 µA/cm² current density was reached. Before polarization, open circuit potentials were recorded while the specimens were stabilized in test electrolyte for 1 h. The breakdown potential ($E_b$) and repassivation potential ($E_{rep}$) were determined from the CPP curves, which were used to compare the corrosion performance of the tested specimens.

Results and Discussion Composite Powder Morphology

The key to attaining an efficient CNT-reinforced composite via powder metallurgy is the synthesis of powder with a uniform dispersion of CNTs, while ensuring the powder is still compatible with the processing route. For SLM, powders must remain spherical and be fairly uniform to ensure paving of the powder and efficient packing within the layers. For these reasons, mild "lower energy" parameters were used to mill the SS-CNT powder to ensure the 316L powder remains suitable for SLM processing. The composite powders synthesized are shown in FIG. 3, where it is seen that the matrix 316L powder is highly spherical, with only mild faceting occurring due to impacts with the milling media and other powder particulates. CNTs are uniformly covering the 316L spherical powders, as seen by the presence of a darker contrast phase, with a greater fraction of the 316L powder surface being covered with CNTs in SS-2CNT as compared to SS-1CNT.

The CNTs survive well under the milling conditions used and are present on the 316L powder in two forms. Darker contrast regions are made of CNTs that are still largely agglomerated but also mostly intact in their initial dimensions, such as that shown in FIG. 3F. Much better dispersion of the CNTs occurs outside of the darker contrast regions [FIG. 3E], where individual strands of CNTs are attached and embedded on the surface. These CNTs have undergone some degree of length reduction due to milling impacts but are still ~1-2 µm in length. One previous study on SLM of SS-CNT is currently available, [Ref. 12], and in that study, the milling conditions used to generate composite powders were much harsher (10:1 BPR for 7 h) and resulted in CNTs that were reduced to lengths of 50-300 nm. Previous experimental and analytical studies on CNT-MMCs have shown the critical length for effective CNT fiber reinforcement to be 850 nm or greater. [Refs. 15 and 20]

Laser energy input may increase convective Marangoni flows within a melt pool and may promote uniform dissemination of CNT. A formation of convection stream within a molten pool may induce liquid capillary force, which in turn may exert on precipitated CNT, and accelerate the CNT arrangement throughout the melt, and may support a homogeneous dispersion in a solidified matrix. Previous work, [Ref. 11 and 6], has shown that SLM processing is ideal for the dispersion of CNTs as the creation of a highly convective melt pool provides an environment for CNTs to be easily dispersed. Hence, a perfect state of dispersed CNTs does not have to be attained during the powder synthesis step. Our low energy approach hence allows us to retain excellent metal powder characteristics, attain adequate dispersion, with the SLM process itself enabling the final break-up and filling of remaining CNT clusters (those present in the darker phase.) The SLM processed composite powders resulted in 3D-printed SS-CNT composites that were fully dense (Table I). The relative density of SS-1CNT (98.3%) was comparable to that of the 3D-printed 316L SS (98.5%), while SS-2CNT had the highest relative density (99.7%).

Hardness and Wear Resistance

Figures 6A, 6B, 6C, 6D, 6E, 6F:
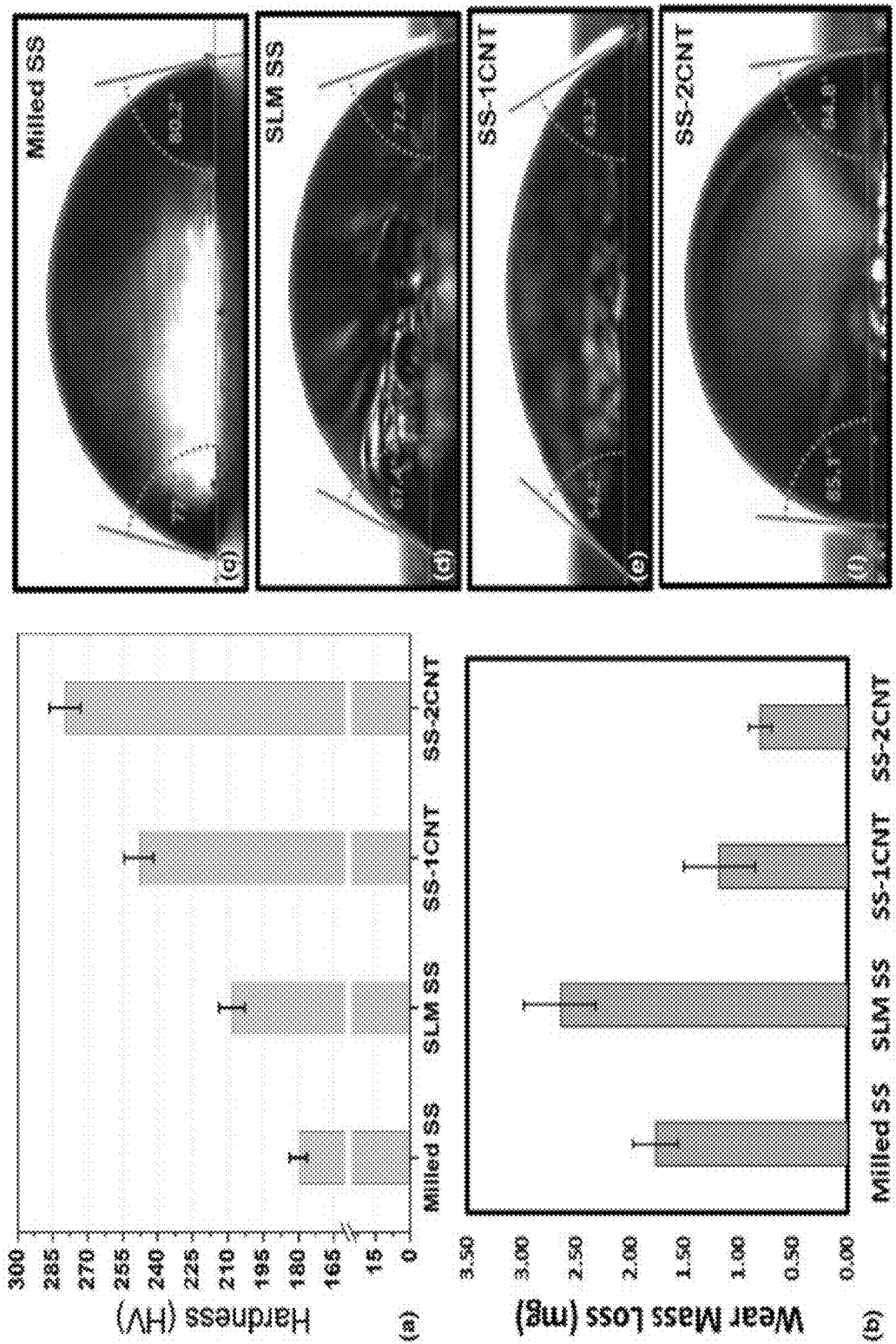
FIGS. 6A-6F show (a) Microhardness of 316L SS and SS-CNT composites, (b) Wear mass loss of 316L SS and SS-CNT composites, and Representative images of water contact angle (WCA) measurements conducted on: (c) conventionally milled 316L SS specimen, (d) SLM printed 316L SS, (e) SS-1CNT, and (f) SS-2CNT.
Figures 7A, 7B, 7C, 7D, 7E:
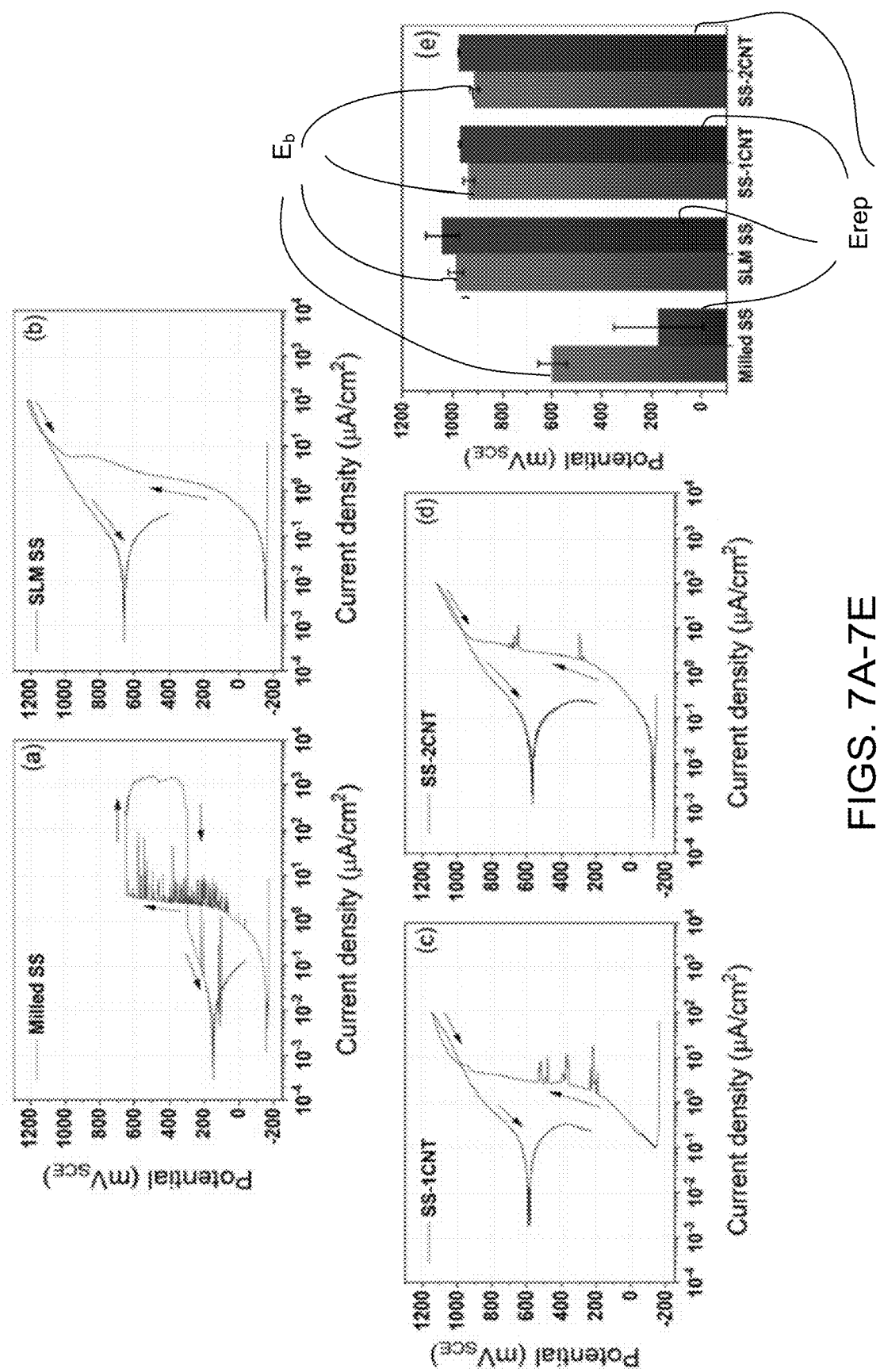
FIGS. 7A-7E show representative cyclic potentiodynamic polarization (CPP) curves of (a) Milled SS, (b) SLM SS, (c) SS-1CNT, and (d) SS-2CNT tested in 3.5 wt % NaCl, (e) pitting potential and repassivation potentials attained from CPP curves.
Figures 8A, 8B, 8C:
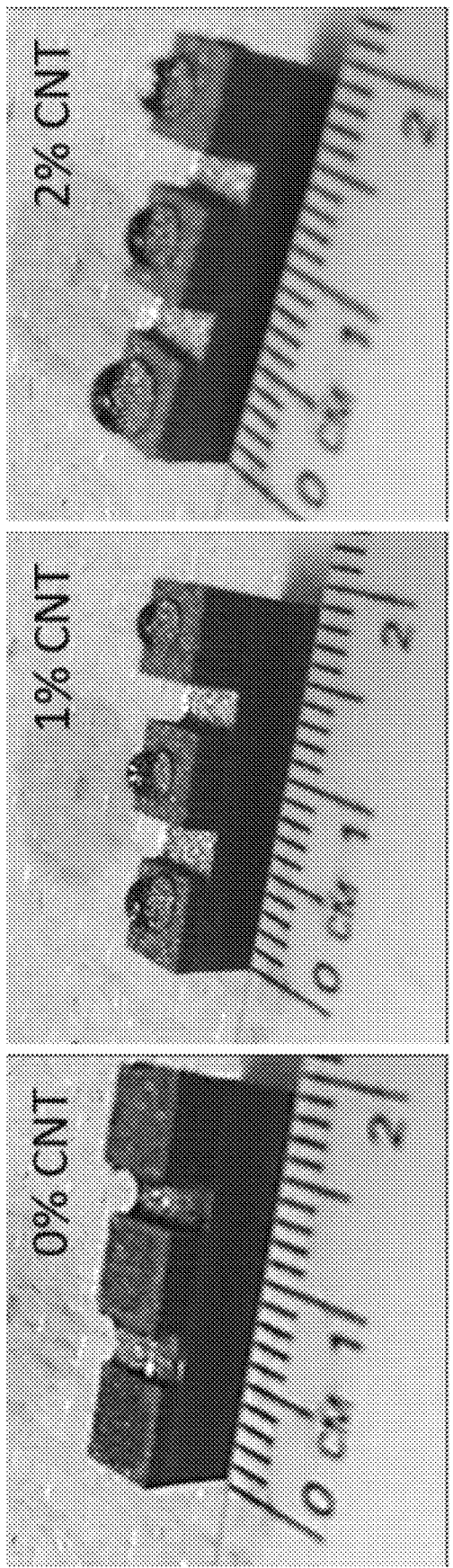
FIGS. 8A-8C, shows 1.0 (FIG. 8A), 2.0 (FIG. 8B), and 3.0 mm (FIG. 8C) in height SEM image of top of pillars along with initial wetting experiments conducted on the printed samples including 0% carbon nanotubes (CNT), 1% CNTs, and 2% CNTs.

Microhardness of milled 316L SS along with the 3D-printed 316LSS and SS-CNT composites is shown in FIG. 6A. The 3D-printed 316L sample had high hardness (208 HV) than the milled 316L SS (180 HV) but was lower than that reported by Yin et al. [Ref. 12] for 3D-printed 316L steel (~230 HV). The addition of 1 and 2 vol % CNT led to an increase in hardness of 19 and 35%, respectively, indicating that the reinforcement effect does approach a plateau at these reinforcement concentrations. This trend is consistent with the findings of Yin et al. [Ref. 12] that showed an increase of ~55% with the addition of ~4 vol % CNT (approximately equivalent to the reported value of 1 wt % CNT). It is noted that previous works on SLM processing of CNT-MMCs have resulted in the complete transformation of CNTs into carbide phases, and reinforcement is thereby attributed exclusively to precipitation hardening. [Ref. 6 and 12] Our previous work on Ti-CNT has shown that CNTs can withstand the SLM process if processed using a low linear laser energy density, resulting in the additional strengthening mechanisms of CNT fiber reinforcement. [Ref. 11]

Hardness is well-known to correlate well with wear resistance, although toughness often plays a more critical role in systems where substantial plastic deformation takes place. Interestingly, according to this disclosure, the SLM-produced 316L SS exhibited a great mass loss during dry sliding wear testing (lower wear resistance) than the conventionally milled 316L sample, despite the higher hardness of SLM 316LSS. SLM-produced materials can contain significant residual stresses due to the severe thermal history consisting of several melting and solidification cycles, which in turn make the material more brittle and prone to cracking. The SS-CNT composites exhibited the highest wear resistance, with the SS-1CNT and SS-2CNT exhibiting reductions in wear relative to SLM 316LSS of 55 and 70%, respectively. Previous work on CNT-MMCs has shown that CNTs can result in simultaneous strengthening and toughening, which would contribute to improved wear resistance. [Refs. 13 and 15] CNTs have also been reported to act as a lubricous phase due to facile interlayer sliding between CNT walls; however, in this disclosure, the coefficient of friction (CoF) values were similar in all of the 3D-printed samples (Table I) This is in contrast to the study by Yin et al. [Ref. 12], where the CNT-SS composite exhibited a significant increase in CoF due to an increase in wear debris formation.

Future studies could focus on the characterization of CNT structural retention and possible carbide formation, the role of CNTs on wear and friction mechanisms, and the effects of CNTs on the microstructural evolution of 316L fabricated by SLM.

Water Contact Angle

Water contact angle (WCA) measurements are provided in Table 1 and representative droplet images are shown in FIGS. 6C-6F.

TABLE I

Properties of 316L and SS-CNT composites.

| Specimen | Density (g/cm³) | Relative density (%) | Hardness (HV) | Wear mass loss (mg) | Coefficient of friction | Water contact angle (°) |
|---|---|---|---|---|---|---|
| Milled 316L SS | 7.67 | 95.9 | 180 ± 4 | 1.77 ± 0.21 | 0.44 ± 0.01 | 80.3 ± 3.6 |
| SLM 316L SS | 7.88 | 98.5 | 208 ± 6 | 2.65 ± 0.33 | 0.55 ± 0.03 | 71.1 ± 5.8 |
| SS-1CNT | 7.81 | 98.3 | 248 ± 6 | 1.18 ± 0.33 | 0.56 ± 0.05 | 55.2 ± 4.8 |
| SS-2CNT | 7.86 | 99.7 | 280 ± 7 | 0.80 ± 0.10 | 0.57 ± 0.03 | 83.0 ± 3.7 |

Among the two unreinforced 316L SS samples, the milled material exhibited a higher WCA than the SLM printed material. This is attributable to the relatively rough surface produced by SLM. It is well documented through experimental and modeling studies, including in 3D-printed metals, [Refs. 21-23] that the WCA will decrease as surface roughness increases, provided the materials are not hydrophobic (WCA≥90°). Aligned forests of CNTs have been shown to be superhydrophobic, [Refs. 24 and 25] and hence it was expected that WCA would increase in the SLM printed CNT-reinforced composite materials. In fact, the SS-1CNT sample actually exhibits the lowest WCA of all materials. The low amount (1 vol %) of reinforcement is insufficient to induce a localized Cassie-Baxter effect that results in not-wetting and hydrophobic characteristics. Instead, the addition of 1 vol % CNTs likely induce higher localized surface roughness. Incorporating nanomaterial reinforcement into composites has been shown to increase localized roughness, even at low volume fractions. [Ref. 26] The lower WCA of SS-1CNT is attributed to CNTs inducing higher localized surface roughness without any transfer of hydrophobic characteristics. However, the SS-2CNT composite exhibits the highest WCA of all materials. This higher volume fraction appears to breach the threshold needed to transfer the hydrophobic characteristics of CNTs onto the metal matrix composite, presumably by a Cassie-Baxter effect induced by uniformly dispersed CNTs on the surface. The hydrophobic effect of CNTs outweigh the expected increase in surface roughness. Increased surface roughness is not detrimental to WCA in materials that exhibit hydrophobic behavior.

Electrochemical Characteristics

The representative cyclic potentiodynamic polarization (CCP) curves of milled SS, SLM SS, SS-1CNT, and SS-2CNT tested in 3.5 wt % NaCl are presented in FIGS. 7A-7D, respectively. The breakdown potential ($E_b$) and repassivation potential ($E_{rep}$) determined from the CPP curves are given in FIG. 7E. The milled SS specimen exhibits significant metastable pitting that is common in conventionally manufactured 316L SS due to the presence of sulfur-rich inclusions. [Ref. 16] The forward scan of milled SS initiated metastable pitting at ~50 mVSCE and gradually increased, reaching an $E_b$ of 599±58 $mV_{SCE}$. The reverse scan was commenced after reaching the 100 μA/cm$^2$ set current density limit, and during the reverse scan, Erep of 173±180 $mV_{SCE}$ was acquired. Comparing the SLM specimens, SLM SS did not exhibit any metastable pitting, but SS-1CNT and SS-2CNT showed minor metastable pitting. During the forward scan, SLM SS, SS-1CNT, and SS-2CNT acquired an Eb of 987±31, 934±21, 912±17 $mV_{SCE}$, respectively, and during the reverse scan, Erep of 1041±68, 970±3, 974±3 $mV_{SCE}$, was seen respectively.

Researchers have attempted to improve the corrosion performance of SLM 316L by modifying the feedstock powder and using Ag [Ref. 27] and soda-lime-glass [Ref. 28] as additives. However, the inability of the additives to distribute themselves into the matrix caused segregation. Segration caused galvanic corrosion between the segregated phases and the stainless steel matrix and deteriorated the corrosion performance of additive added SLMed 316L. In this research, the corrosion performance of SLM SS is superior to Milled SS and SLM SS reported in the literature. [Ref. 29 and 30] Although the addition of CNTs caused minor metastable pitting, the corrosion performance has been retained as evidenced by the similar breakdown and repassivation potential to SLM SS.

CONCLUSIONS

Selective laser melting (SLM) is used to 3D print 316L stainless steel (SS) composites reinforced with 1 and 2 vol % of carbon nanotubes (CNTs). High-energy ball milling (HEBM) using mild milling parameters is used to homogeneously disperse CNTs onto the surface of 316L SS powders, without significant modification of the spherical morphology needed for efficient SLM processing. CNTs enhanced the hardness and wear resistance of the composite by 35, and 70%, respectively, in comparison to unreinforced SLM fabricated 316L SS material. SLM-produced materials and parts are known to have a rough surface finish, which causes a decrease in the wetting contact angle (WCA), as compared to conventionally processed material. The addition of 2 vol % CNT reverses this trend and increases the WCA by 17%, relative to SLM processed 316L SS. The addition of CNTs had no significant adverse effects on the electrochemical characteristics of the composites, aside from some signs of metastable pitting. This retention of the excellent corrosion resistance of 316L SS, along with increases in hardness, wear resistance, and WCA makes SS-CNT composites promising candidates for structural marine applications. Furthermore, CNTs decrease density and hence increase specific strength. The use of 3D printing makes these materials suitable for being manufactured at the point of need in expeditionary environments such as humanitarian and military missions.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A 3D printed hydrophobic metallic component comprising:
multiple metallic layers deposited successively, wherein each metallic layer comprises a metallic surface and multiple asperities;
the multiple asperities comprising arrays of micropillars configured to create an air barrier between the metallic surface and a water droplet, wherein the air barrier induces a Cassie-Baxter state and hydrophobic effect; the multiple asperities formed by a method comprising,
  providing a composite powder, the composite powder generated by mixing a metal powder with a nanotube material in a high energy ball mill, and
  melting, by selective laser melting, the composite powder to form a melt pool, wherein the melt pool disseminates the nanotube material, wherein the dispersed nanotube materials form arrays of micropillars;
  purging, by an argon gas, the environment around the melt pool; and
  cooling, by the argon gas, the melt pool.

2. The component of claim 1, wherein the nanotube material is carbon nanotubes (CNTs).

3. The component of claim 2, wherein the composite powder is 1% or 2% CNT by volume.

4. The component of claim 2, wherein the selective laser melting machine is configured to have a target energy density that is low enough to ensure particulates of the CNT do not dissolve.

5. The component of claim 2, wherein the CNT is approximately 0.1% to 3% by volume of the composite powder.

6. The component of claim 1, wherein the metallic powder is 316L stainless steel powder.

7. The component of claim 1, wherein the composite powder comprises metal powder and boron nitride.

8. The component of claim 1, wherein the composite powder comprises carbon nanotubes (CNTs) and stainless steel powder.

9. The component of claim 8, wherein the carbon nanotube is a multiwall CNT having lengths in the range of 10-30 μms and diameters in the range of 10-20 nm.

10. The component of claim 1, wherein the composite powder is 3D printed directly on a surface of another body.

11. A 3D-printed stainless steel composite structure comprising:
  multiple metallic layers deposited successively, wherein each metallic layer comprises a stainless steel surface and multiple asperities;
  the multiple asperities comprising arrays of carbon nanotube (CNT) micropillars configured to create an air barrier between the stainless steel surface and a water droplet, wherein the air barrier induces a Cassie-Baxter state and hydrophobic effect.

* * * * *